June 5, 1951  T. A. KRIVANEK ET AL  2,555,550
SURGICAL SNARE

Filed Feb. 4, 1948  2 Sheets-Sheet 1

INVENTORS
T. A. Krivanek and
BY R. T. Krivanek
Ray A. Gehr ATTORNEY

June 5, 1951  T. A. KRIVANEK ET AL  2,555,550
SURGICAL SNARE

Filed Feb. 4, 1948  2 Sheets-Sheet 2

INVENTORS
T. A. Krivanek and
BY R. T. Krivanek
Ray A. Gehr ATTORNEY

Patented June 5, 1951

2,555,550

UNITED STATES PATENT OFFICE 2,555,550

SURGICAL SNARE

Thomas A. Krivanek and Roy T. Krivanek,
Shaker Heights, Ohio

Application February 4, 1948, Serial No. 6,126

4 Claims. (Cl. 128—357)

The invention relates to surgical appliances and particularly to curettes or snare devices such as are used for the removal of foreign particles from the eye or from wounds.

Instruments for the purpose stated have heretofore been made which were fitted with a looped filiform body of metal, horse hair or other material and such appliances have met with considerable favor. Instruments have also been provided having a permanent magnet for removal of magnetizable metal particles from the eye or a wound.

It is an object of the present invention to provide an instrument having a filiform loop snare formed and mounted in an improved manner both with respect to the functioning of the instrument in use and with respect to its manufacture.

More specifically, it is an object of the invention to provide a filiform loop type of appliance in which the loop is so mounted as to have marked freedom of movement in relation to its support while still subject to effective control by the user.

Another object of the invention is to provide a curette which combines the advantages of both the loop snare and the magnet snare and has a substantially non-magnetic enclosure for the magnet.

With the above and other incidental objects in view the invention consists in certain forms, arrangements and combinations of parts which will be exemplified and explained by reference to specific preferred constructions shown in the accompanying drawings and thereafter defined in the appended claims.

Figure 1:
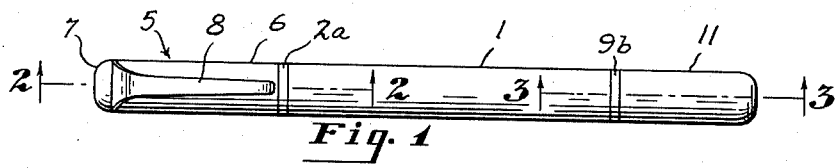
Fig. 1 is a side elevation of an appliance embodying the invention.

Referring first to the form of device shown in Figs. 1-5, which is intended for professional use, 1 is a tubular metal body which is fitted at one end with a plug 2. The plug 2 is preferably formed intermediate its ends with an annular flange 2a and is knurled at 2b on lines parallel to the axis of the plug. Thus formed the plug is easily given a forced fit in tube 1 without the need of forming the mating dimensions of the two parts with a high degree of accuracy. The plug 2 also is formed with an axial bore 2c to receive a supporting member 3 for a snare loop generally designated by the numeral 4. The support 3 is formed with an axial bore 3b and with an external longitudinally knurled surface 3c at one end of a diameter to be forced into the bore 2c to bring the shoulder 3a of part 3 into firm engagement with the adjacent end of plug 2, the knurled surface 3c having the same purpose as that at 2b. The support 3 is preferably tapered externally as shown and has its bore reduced in diameter at its tapered end.

Figure 2:
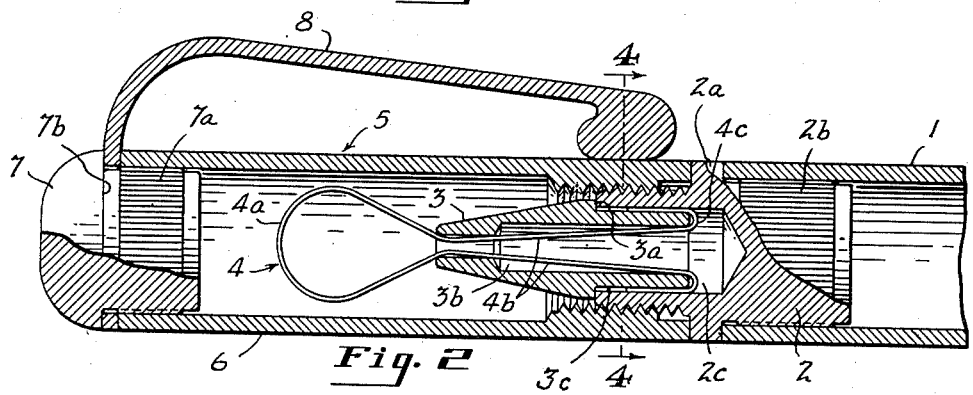
Figs. 2 and 3 are enlarged longitudinal axial sections of the left end and right end, respectively, of the device shown in Fig. 1.
Figure 3:
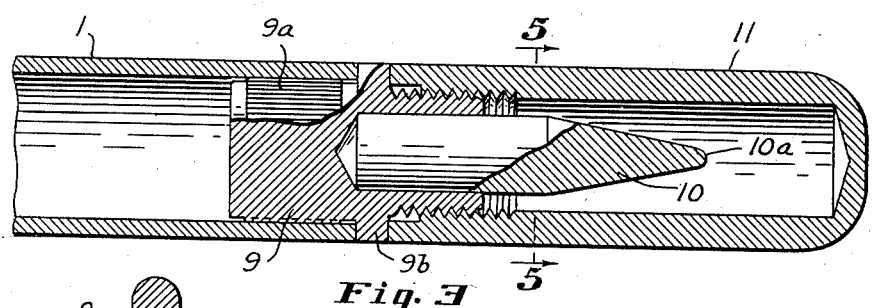
Figure 4:
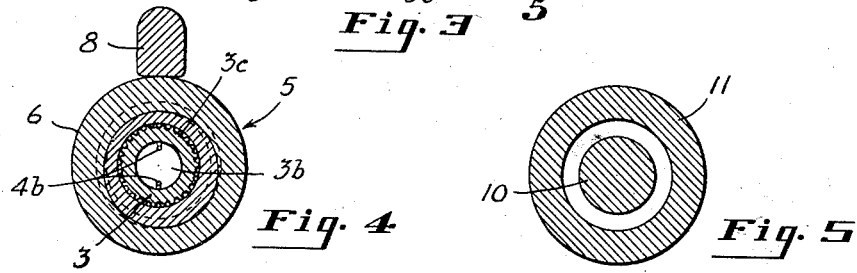
Fig. 4 is a transverse section on the line 4—4 of Fig. 2.
Figure 5:
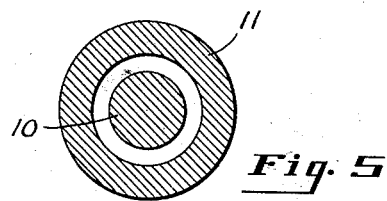
Fig. 5 is a transverse section on the line 5—5 of Fig. 3.

The filiform loop 4 is formed from a section of fine stainless steel wire (a diameter of .005" being suitable) by folding the wire upon itself to form the rounded loop bend 4a and straight arm sections 4b, 4b. The ends of the arms 4b are bent outward at 4c over the rounded inner end of the support 3 and clamped between the said support and the wall of the bore 2c of plug 2 as shown in Figs. 2 and 4. The ends of the arms 4b rest between ridges of the knurled surface 3c which, in assembly, are swaged against the arms to secure them in position without the necessity of highly accurate fitting of the parts. The bore surface of plug 2 and the inner end of support 3 thus serve to tightly hold the inner ends of the loop arms 4b. In the fabricating assembly of the three parts 2, 3 and 4 the folded loop 4 has its arms 4b inserted through the bore of support 3, and a fixture, in the form of a rod having a cross-section shaped to fit within the loop bend 4a is passed through the loop to maintain the form of the bend 4a while the ends of the arms 4b are bent around the inner end of support 3 and the assembled loop and support forced into the bore 2c until the shoulder 3a of the support 3 firmly engages the end of plug 2. This forcing operation tends to draw the loop bend 4a into the bore of support 3 and distort the loop but that is prevented by the use of the fixture rod. While the inner ends of the loop arms 4b are fixedly supported as above described, their outer ends are loosely supported by the front end of support 3 for limited lateral movement in its bore.

To provide protection for the exposed part of the loop, which is highly flexible, the supporting plug 2 is threaded to receive a cap generally designated by the numeral 5. The cap comprises a tubular section 6 threaded at one end to engage plug 2 and a plug 7 which closes the other end of section 6. The plug is knurled at 7a to provide for a readily established forced fit in the tube. The plug 7 is also formed with a shoulder 7b to engage and secure to the cap 5 a spring clasp 8 so that the instrument can conveniently be carried in the pocket of the user.

The instrument is also provided with a permanent-magnet snare. For this purpose one end of the tubular body 1 is provided with a closure plug 9 which may be identical in form and size with the plug 2. In the axial bore of plug 9 is mounted a permanent magnet 10 of rod form, the magnet being secured by a forced fit in the plug and having its exposed part formed with a tapered and rounded end 10a, the tapered and rounded surfaces of the magnet being smoothly polished for safe engagement with the ball or lid tissues of the eye. Plug 9 is fitted with a removable screw cap 11 to tightly enclose the magnet.

All parts of the instrument are formed of metal and preferably all of the parts are formed of stainless steel with the exception of the clasp 8 which may be made of brass and chromium plated for greater ease of fabrication. The magnet 10 is preferably formed of steel such as that marketed by General Electric Company under the name Alnico. This material has the non-corrodible characteristics of stainless steel and a magnet formed of the material, after an initial drop of about 10% of its magnetism, retains the balance practically indefinitely. The plug 9 and cap 11 are preferably made of stainless steel of a non-magnetizable variety. In fact all of the stainless steel parts of the instrument preferably are made of such material. The reason for this is to minimize magnetization of the enclosing and supporting structure of the magnet and prevent troublesome attraction of external magnetizable objects.

In the use of the instrument the functioning of the snare loop 4 is distinctive because of its formation and the manner in which it is supported. That is to say the straight arm portions 4b of the loop are fixedly secured to the supporting structure only at the inner end of the part 3 and are loosely supported in the reduced portion of the bore 3b adjacent the exposed loop bend 4a. Thus mounted or supported the loop portion 4a, because of possible limited movement of the straight arms 4b within the bore 3b, is allowed very considerable freedom for bending and twisting movement (under manual manipulation by the user) to facilitate conformation of the loop to the surface of the eyeball or eye lid or wound surface being explored. At the same time the reduced section of bore 3b limits the movement of the loop structure to such an extent that the exposed part of the loop can be manipulated and controlled effectively.

The mounting of the snare 4 and the magnet 10 in the two ends of rod-shaped support 1 affords a combined instrument having marked advantages. In addition to obvious convenience secured, an improved technique is made possible by the speed and ease which an unaided operator can, with the one instrument, shift from snare to magnet, or vice versa, in the removal of a foreign body.

Figure 6:
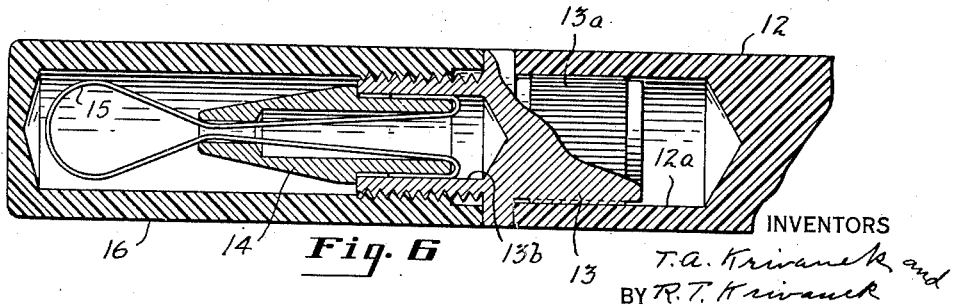
Fig. 6 is a longitudinal axial section, also on an enlarged scale, showing a modified form of the appliance.

In the modified form of construction shown in Fig. 6 a rod-like body 12, which may be formed of suitable plastic material, has an axial recess 12a to receive a knurled and flanged plug 13 of the same character as the plugs 2 and 9 of the instrument first described. Plug 13 is preferably formed of metal and in the interest of ease of working and low cost may be made of suitable aluminum alloy. The plug 13 is formed with an axial bore 13b to receive a loop support 14 which also may be formed of aluminum alloy and is otherwise of the same character as the support 3 in Fig. 1. 15 is a snare loop preferably formed of stainless steel and mounted in the manner described in connection with Fig. 1. To enclose and protect the snare loop the instrument is provided with a screw cap 16 preferably formed of plastic material.

An instrument such as that shown in Fig. 6 functions in the same manner as the loop section of the instrument first described but is more compact and can conveniently be carried in pocket or handbag for emergency use.

It will be appreciated that instruments such as those shown and described are susceptible of easy sterilization throughout by usual techniques with steam, boiling water or alcohol and that after sterilization the working parts of the instruments (loop and magnet) are effectively maintained in sterile condition by tight enclosure within the protecting caps.

Figure 7:
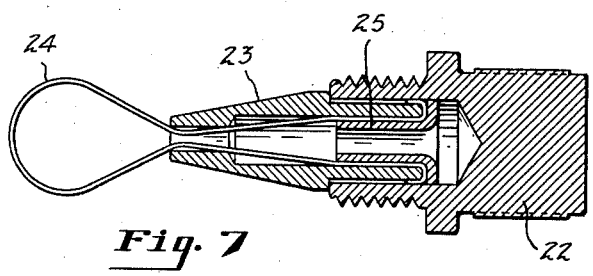
Figs. 7, 8 and 9 are fragmentary axial sections showing on an enlarged scale three alternative forms of supporting means for the filiform loop of the appliance which can be used in lieu of the support structure shown in Figs. 2 and 6.

In the modified construction shown in Fig. 7 the plug 22, supporting member 23 and loop 24 are substantially the same as the parts 2, 3 and 4, respectively, in the construction shown in Figs. 2 and 4. Here, however, the means for tightly holding the inner ends of the loop arms comprise a flanged sleeve 25 which is forced into the bore of member 23 to tightly clamp the two arms of the loop between the parts 23 and 25.

Figure 8:
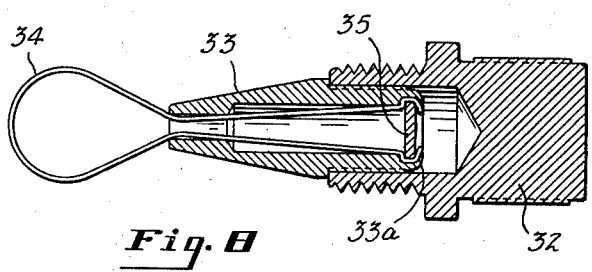

The construction shown in Fig. 8 has a plug 32 that is the same as plug 2 of Fig. 2 and its support 33 and loop 34 are generally similar to the corresponding parts of the Fig. 2 construction. However, the support 33 has the inner end of its bore enlarged to receive a disc 35, preferably of metal, which serves when forced into the bore of support 33 to tightly secure the ends of loop 34 to the inner end of support 33. When disc 35 has been forced into position the relatively thin wall at the inner end of support 33 is crimped inward at 33a to secure the disc in position.

Figure 9:
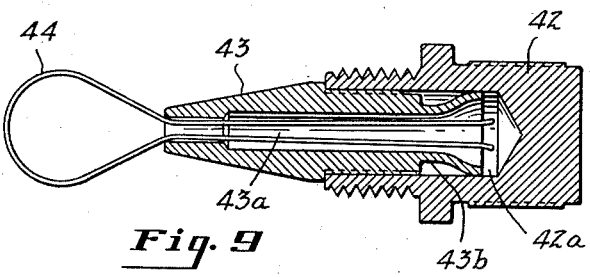
Figure 10:
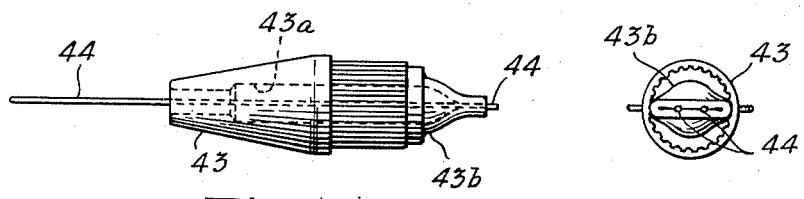
Fig. 10 is a side elevation of the loop and its immediate supporting member of the form shown in Fig. 9.
Figure 11:
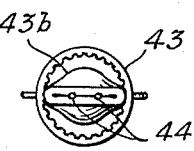
Fig. 11 is a right end view of the structure shown in Fig. 10.

Finally, in the construction shown in Figs. 9, 10 and 11, a plug member 42 is provided having a somewhat deeper bore 42a to receive still another form of supporting member 43 for snare loop 44. Support 43 has a somewhat greater length and a bore 43a of less diameter than do the corresponding supports of the other constructions. The purpose of the added length of support 43 is to provide at the inner end thereof a section 43b of reduced outer diameter and relatively thin wall which can be flattened, as indicated in Figs. 10 and 11, to tightly hold the ends of the loop 44.

In all of the various forms of construction, it will be observed, the supporting structure for the loop member serves to tightly hold the arms of the loop at mutually adjacent points remote from the loop bend and to loosely support the loop arms at points relatively close to the loop bend.

It is to be understood that the constructions which have been shown and described are presented for purposes of explanation and not limitation and that the invention includes all equivalent constructions within the bounds of the appended claims.

What is claimed is:

1. In a surgical appliance, the combination of a filiform snare member bent intermediate its ends to form a loop with arms extending therefrom; and a rod-shaped structure for supporting the loop comprising means tightly holding the arms of the loop at mutually adjacent points remote from the loop bend and means by which the loop arms are loosely engaged and supported at mutually adjacent points relatively close to the bend of the loop for bending and twisting movement.

2. A surgical appliance as claimed in claim 1 in which the supporting structure for the loop comprises a part with a cylindrical recess and a tubular member telescoped in the recess with the arms of the loop member extended through and loosely enclosed in the tubular member and their ends bent back on the outer surface of the tubular member and clamped between said member and the recessed part of the supporting structure.

3. A surgical appliance as claimed in claim 1 in which the supporting structure for the loop comprises a part with a cylindrical recess and a tubular member telescoped in the recess with the arms of the loop member extended through and loosely enclosed in the tubular member and their ends bent back on the outer surface of the tubular member and clamped between said member and the recessed part of the supporting structure, and in which the tubular member of the supporting structure is formed with an annular shoulder which engages an opposing annular surface of the recessed supporting part.

4. A surgical appliance as claimed in claim 1 in which the supporting means for the loop comprises a tubular member in the bore of which the two arms of the loop member are loosely enclosed with freedom for the bending and twisting movement and a part tightly clamping the arms of the loop to the tubular member at points remote from the bend of the loop.

THOMAS A. KRIVANEK.
ROY T. KRIVANEK.

REFERENCES CITED

The following references are of record in the file of this patent:

UNITED STATES PATENTS

| Number | Name | Date |
|---|---|---|
| 1,386,309 | Bingman | Aug. 2, 1921 |
| 1,726,349 | Hartsough | Apr. 27, 1929 |

FOREIGN PATENTS

| Number | Country | Date |
|---|---|---|
| 239,112 | Switzerland | Dec. 3, 1945 |
| 441,632 | Germany | Mar. 8, 1927 |